US009072036B2

(12) United States Patent
Dunn et al.

(10) Patent No.: US 9,072,036 B2
(45) Date of Patent: Jun. 30, 2015

(54) METHOD FOR SELECTING AN AIR INTERFACE ON A MULTI-MODE WIRELESS DEVICE

(75) Inventors: Douglas L. Dunn, Chula Vista, CA (US); Henry S. Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 840 days.

(21) Appl. No.: 12/823,775

(22) Filed: Jun. 25, 2010

(65) Prior Publication Data

US 2010/0262682 A1 Oct. 14, 2010

Related U.S. Application Data

(62) Division of application No. 11/380,875, filed on Apr. 28, 2006, now abandoned.

(51) Int. Cl.
*G06F 15/16* (2006.01)
*H04W 48/18* (2009.01)
*H04W 8/18* (2009.01)
*H04W 88/06* (2009.01)

(52) U.S. Cl.
CPC .............. *H04W 48/18* (2013.01); *H04W 8/183* (2013.01); *H04W 88/06* (2013.01)

(58) Field of Classification Search
CPC ...... H04W 80/06; H04W 48/18; H04L 67/04; H04L 12/06; H04L 63/101; H04L 67/14
USPC ................................. 709/227, 228
See application file for complete search history.

(56) References Cited

U.S. PATENT DOCUMENTS

| | | | | |
|---|---|---|---|---|
| 5,072,449 A * | 12/1991 | Enns et al. | ..................... | 714/776 |
| 5,754,564 A * | 5/1998 | Francis | ......................... | 714/752 |
| 5,903,832 A * | 5/1999 | Seppanen et al. | .......... | 455/435.3 |
| 7,245,913 B1 * | 7/2007 | Nguyen et al. | ............. | 455/435.2 |
| 7,689,218 B2 * | 3/2010 | Jiang et al. | .................. | 455/435.2 |
| 7,962,136 B2 * | 6/2011 | Bocking et al. | ............ | 455/432.1 |
| 2002/0087674 A1 * | 7/2002 | Guilford et al. | ............. | 709/223 |
| 2003/0054809 A1 * | 3/2003 | Bridges et al. | ................ | 455/419 |
| 2003/0214916 A1 * | 11/2003 | Khawand et al. | ............ | 370/278 |
| 2004/0062267 A1 * | 4/2004 | Minami et al. | ................ | 370/463 |
| 2004/0249915 A1 * | 12/2004 | Russell | ......................... | 709/223 |
| 2005/0037755 A1 * | 2/2005 | Hind et al. | .................. | 455/435.3 |
| 2005/0091357 A1 * | 4/2005 | Krantz et al. | ................. | 709/223 |
| 2005/0239443 A1 * | 10/2005 | Watanabe et al. | .......... | 455/414.1 |
| 2005/0282544 A1 * | 12/2005 | Oommen et al. | .......... | 455/432.1 |
| 2006/0234705 A1 * | 10/2006 | Oommen | .................... | 455/435.3 |
| 2006/0274750 A1 * | 12/2006 | Babbar et al. | ................. | 370/390 |
| 2006/0285538 A1 * | 12/2006 | Oommen | ...................... | 370/356 |
| 2007/0037530 A1 * | 2/2007 | Peckham et al. | .............. | 455/102 |
| 2011/0282985 A1 * | 11/2011 | Krantz et al. | ................. | 709/223 |
| 2013/0114504 A1 * | 5/2013 | Zhao | ............................ | 370/328 |

* cited by examiner

*Primary Examiner* — Larry Donaghue

(57) ABSTRACT

A method for selecting an air interface on a multi-mode wireless device capable of communicating over a plurality of air interfaces. The method comprising starting a first application and selecting a first application specific access list of a set of application specific access lists, the first application specific access list corresponding to the first application. The method also comprising selecting a first active network from the first application access specific list, the first network representing an available and most desirable network for the first application in the first application specific access list. The method further activating the first active network for use by the first application and switching from the first active network to a second active network if a user switches from the first application to a second application, wherein the first active network and the second active network are ascertained based on the set of application specific access lists.

19 Claims, 5 Drawing Sheets

METHOD FOR SELECTING AN AIR INTERFACE ON A MULTI-MODE WIRELESS DEVICE

RELATED APPLICATIONS

This is a divisional application of U.S. patent application Ser. No. 11/380,875, filed Apr. 28, 2006 now abandoned, by inventors DUNN, DOUGLAS and CHANG, HENRY S. and incorporated herein by reference.

FIELD OF THE INVENTION

The present invention relates generally to wireless communications, and more specifically to selecting an air interface system using a searchable access list.

BACKGROUND OF THE INVENTION

Wireless subscriber devices are widely used and have become an essential aspect of modern life. Wireless subscriber devices such as pagers, mobile phones, PDA's (personal data assistants) are used for work, for personal activities, and as a way to keep in contact with friends and family. Often these devices are used to enable voice communications. Increasingly, however, these devices are used to share data messages without initiating a voice communication. These data messages may be for example, text messages, image files, video files, or audio files. As the functionality of these devices increases, their use and acceptance continues to expand. Further, users have become more reliant upon their wireless devices, and therefore demand high quality service and performance.

In the current competitive market for wireless devices, a company's reputation and brand is mostly determined by the quality of its products. For example, users have an expectation for their wireless services will initiate with little delay. Currently when users activate their mobile devices to make a call or initiate a data service, part of the process requires that mobile devices scan large access lists to find an active network. In some wireless technologies this access list is referred to as a Preferred Roaming List, while it will have other names in other wireless technologies. The access list is prioritized to have the most preferred networks listed first, and less desirable networks further down on the list. In this way, the manufacturer of the mobile device or the service provider may preset the preferred network connections. When the mobile device is first activated, or when it is taken to a new geographic location and turned on, the mobile device will need to search the access list to find the most preferred network connection. In some cases, the access list can have hundreds of entries, and the mobile devices may take a minute or more to locate a service. After finding an active service, the mobile device may locally store a recently used access list that is first used before searching through the full list.

For example, if a person flies from San Diego to Boston, and turns on a mobile phone when deplaning in Boston, the mobile phone will have to initiate a search of the access list, and since the mobile phone's geographic location has significantly changed, it may have to search tens or even hundreds of possible networks before finding an active Boston network. Once the phone finds a network in Boston, it enters that network into its shorter list of recently used networks, so that the next search will be faster. However, the user has been without mobile phone usage for some time, and may become impatient with the long "searching" indicator on the mobile phone. Once a network connection is made, it is used for all voice and data communications.

In order for mobile devices to have more utility, mobile devices may now support multiple wireless technologies. This enables a single wireless mobile device to have a better chance of always being able to find an active network. A wireless device that supports multiple wireless technologies is often referred to as a multi-mode mobile device. For example, a multi-mode mobile device may support CDMA2000, GSM, WLAN and WiMax. When the multi-mode mobile device is activated, it searches its access list to find the first active network. It will normally search its recently used list, but if none is available, it will begin searching the full access list. Typically, this access list has been set and prioritized by the primary service provider, so the access list will be prioritized to maximize economic benefit to the service provider. In some cases, the multi-mode mobile device will search all possible connections for one technology, and if no connection is found, move to search the next less preferred technology. The access list is searched technology-by-technology, and network-by-network, until the first available network is found. This first-found connection is then used for all voice and data communications. In such a multi-mode environment, the multi-mode mobile device may take an exceptionally, and unacceptably, long time to search through the available wireless technologies to find an available network.

As wireless technologies advance, some technologies are developed for specific purposes, or are better suited for particular applications. For example, some wireless technologies are particularly well suited for high speed data transmission, such as WiFi, but the technology performs best in static or nomadic applications where the receiver has only limited mobility. Other wireless technologies, such as CDMA1xrtt, have excellent voice handling capabilities, support full-speed mobility, but have slower data rates than some other wireless technologies. In using these multi-mode devices, a user typically makes a decision as to which technology is best suited for the task to be performed. For example, if a user wants to surf the net while at a coffee shop, the user will select to search for a WiFi connection, and may even have to physically or logically enable WiFi radio. In another example, if the user is moving in a car and desires to make a voice call, the user may simply use the mobile device's default CDMA radio.

Therefore, a need exists for a multi-mode wireless device that simplifies the mode selection process, as well as reduces the time it takes to make the selection and acquire a network.

SUMMARY OF THE INVENTION

Briefly, the present invention provides application-specific access lists for a multimode mobile wireless device. The multimode mobile device has an access list for each wireless technology. Typically, these technology specific access lists are provided by the service provider for each technology, and are provided by a service provider or the manufacturer of the multimode mobile device. For each application or, class of applications, the multimode wireless device is a likely to operate, an application-specific access list is generated. The application-specific access list ranks each of the supported wireless technologies according to its relative desirability for the application. In this way, when the multimode mobile device request an application, the application-specific access list may be used to efficiently acquire a network preferred for that particular application. The application-specific access lists may be updated from time to time as applications are added or changed, as technology specific access lists are updated, or as geographic location changes.

In a particular example, a mobile handset is a multimode handset capable of operating on more than one wireless technology. The multimode handset contains a plurality of technology specific access lists, typically one for each supported wireless technology. Technology specific access list may be provided for CDMA, GSM, WLAN, or WiMax systems, as well as others. The mobile handset may generate a set of application specific access lists by sorting or ranking network entries from the technology specific access lists based on their suitability for a particular application and the mobile handset's current geographic region. The mobile handset may also contain lists of recently used networks arranged and ranked by application. When the mobile handset requests an application, it will select the application-specific access list associated with the request an application, and sequentially search the application specific access list until a suitable network is discovered.

Advantageously, the present invention efficiently identifies a desirable network according to specific application requirements. This may reduce time to connect to a network, as well as provide a network operating the more preferred wireless technology.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Figure 1:
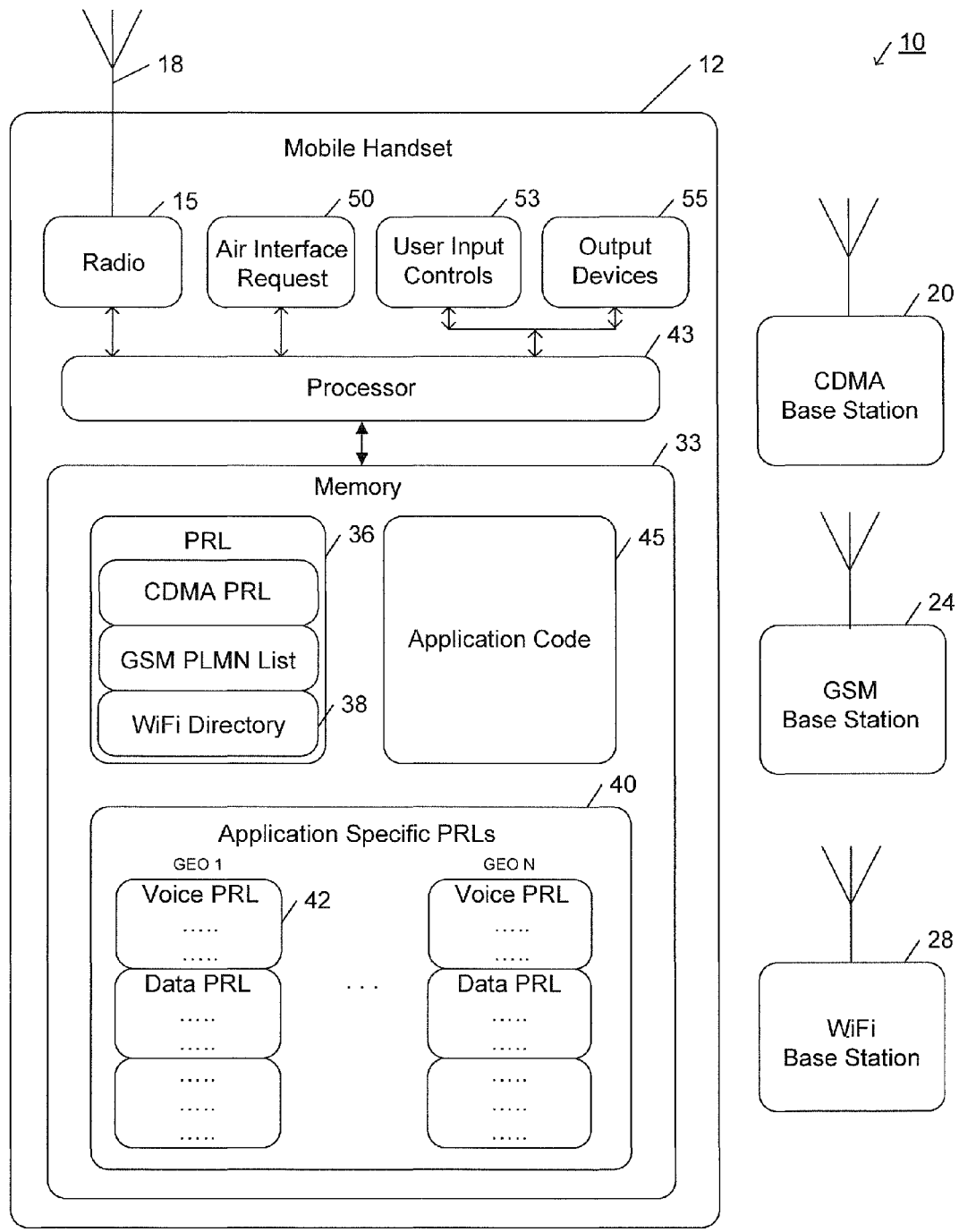
FIG. 1 is a block diagram of a system for selecting an air interface for a multi-mode mobile device in accordance with the present invention.

Referring now to FIG. 1, a system for selecting an air interface for a multi-mode mobile device is illustrated. System 10 has wireless subscriber device 12 structured and configured to operate on one of multiple wireless technologies. Accordingly, device 12 is a multi-mode mobile device. In any given location, more than one of its supported wireless technologies may be available, and therefore, the multi-mode wireless device 12 intelligently and adaptively selects which available wireless technology to use. For example, FIG. 1 shows that mobile device 12 is in range of CDMA basestation 20, GSM basestation 24, and WiFi access point 28. Depending on the specific application the device is to perform, the device may connect to a different basestation and a different wireless technology. If the mobile device 12 desires to make a high quality voice call, then device 12 may prefer to connect to CDMA basestation 20. Alternatively, if device 12 desires to receive high-bandwidth streaming video, then device 12 may prefer to connect to WiFi access point 28. In this way, multimode device 12 prefers the wireless technology best suited to the specific application to be performed.

Wireless subscriber device 12 may be, for example, a wireless handset, a wireless personal data assistant, a portable computer, a router, or other wireless device. Wireless device 12 may operate according to two or more of the international communication standards such as CDMA, UMTS, GSM, EDGE, PHS, or other existing or evolving communication standards. It will also be appreciated that wireless device 12 may operate according to communication standards such as Bluetooth®, IEEE 802.11, WiMax, or other proprietary or data standards. Also, wireless device 12 may operate according to a traditional cellular arrangement, a peer to peer arrangement, or a mesh network.

Wireless device 12 has radio 15 and antenna structure 18 for wirelessly transmitting and receiving messages. It will be understood that multi-mode device 12 may have multiple radios according to the available wireless technologies. In some cases, a single radio device may be able to support more than one technology, and in other cases, a radio may only support a single wireless technology. Each radio is able to communicate messages, for example, voice messages, data messages, or network control messages. In this regard, the base station or other wireless infrastructure may continually send network messages to wireless device 12 and wireless device 12 may respond with status or other messages. The number, content, and frequency of these messages is according to the relevant operating communication standard. Radio 15 and antenna 18 cooperate with wireless device 12 in scanning for and acquiring a suitable air interface system with base stations 20, 24, and 28.

Multi-mode device 12 has a set of technology specific access lists 36. Each of these technology specific access lists 36 has been provided by the manufacturer of device 12, or have been provided or updated by a respective service provider. For example, WiFi directory 38 may be updated from time to time by a WiFi service provider, just as the CDMA Preferred Roaming List may be updated by a CDMA service provider. Each of these technology specific access lists may define many possible SID/NID pairs or the equivalent, and have been prioritized by their respective service providers. Importantly, each of these technology specific access lists is provided according to the standard requirements for each wireless technology, so the use of multi-mode device 12 does not require any modification to the network provider or communication standards. This means that the improvements to acquisition time and improved performance are not dependent on any one communication standard.

Multi-mode device 12 uses the technology specific access lists 36 to generate a set of application specific access lists 40. Each of the application specific access lists is generated according to the requirements of a particular application, and may define networks from more than one technology. For example, voice access list 42 may be generated to first look for a particular CDMA2000 1x provider, then for a particular GSM provider, then for a particular 1xEV-DO provider, and finally, for a particular WiMax provider. In this way, multimode device 12 is able to find and acquire the wireless network that is most suited to the application to be performed. The application specific access lists are typically generated when device 12 is first initialized, but may be continually updated as applications, locations, or technology specific lists 40 change. The generation of the application specific access lists is preferably done at times when spare processing power is available, for example, when device 12 is operating but no time-critical tasks are being performed.

Multi-mode device 12 may generate application specific access lists for various available applications, such as voice call, data uplink, security level, quality of service, level of mobility, high speed data downlink, low speed data downlink, VoIP, circuit-switched (CS) Voice, or any other conceived application. In this way, multi-mode device 12 is able to search for and acquire a network most appropriate for the actual application to be performed. For example, device 12 may have used a voice access list to acquire a cdma2000 1x network so that a use may make a high quality voice call. When the call ends, the user starts a browser, and desires to enable a communication link with a high speed downlink capability. If the user is stationary, device 12 may use a stationary-data access list, and look for preferred WiFi and WiMax technologies, and then settle for a regular CDMA or GPRS network if they are not available, However, if the user is moving, then device 12 may use a moving-data access list to find a 1xEvDO, GPRS, or cdma2000 1x network. It will be appreciated that many application access lists may be generated, and that lists may be generated for specific combinations of applications, such as "high data rate/moving/secure" communication.

Wireless device 12 typically has processor 43 for controlling the device's operation. In this regard, processor 43 may perform traditional telephony call processing functions, as well as logic and data managing functions. It will be appreciated that processor 43 may be a single device, or functionally may be distributed among two or more processing devices. Processor 43 has associated memory 33 for operating processes and storing data such as air interface system lists. It will be appreciated that memory 33 may be a cache memory, a flash memory, a random access memory, or a read only memory. It will also be understood that memory 21 may include fixed or removable memory, and memory 33 may be provided as one or more discrete blocks.

Processor 43 operates software processes for managing calls, data, and user interaction. In particular, processor 43 may operate a software process such as software process 45. Application code 45 may be for example, executable object code, source code, or firmware in reprogrammable memory. Reprogrammable memory may be, for example firmware in the form of EEPROM or flash memory. During operation, application code 45 may generate an air interface system request 50. Air interface system request 50 may generate a flag requesting an air interface system from a specific application specific air interface list 40. In the alternative, air interface system request 50 may generate a flag containing application specific criteria for an air interface system. Processor 43 will receive air interface system request 50 and initiate an air interface scanning and acquisition process. Processor 43 may access memory 33 and sequentially select from air interface system entries 44 contained in an appropriate application specific access list 40. Processor 43 may also sequentially select air interface system entries 38 from any air interface system list 36 in the air interface system scanning and acquisition processes. Processor 43 may cooperate with memory 33, radio 15, and antenna structure 18 in acquiring a communication link with a suitable base station 20, 24, or 28.

Wireless device 12 includes output devices 55 for presenting and communicating to a user. For example, output devices 55 may include a color or monochrome display, a speaker, lamps, a vibrator, or other output device. Wireless device 12 also has user input controls 53. Typical user input controls 53 may include navigation keys, keypads, rotary knobs, stylus, or voice command.

Figure 2:
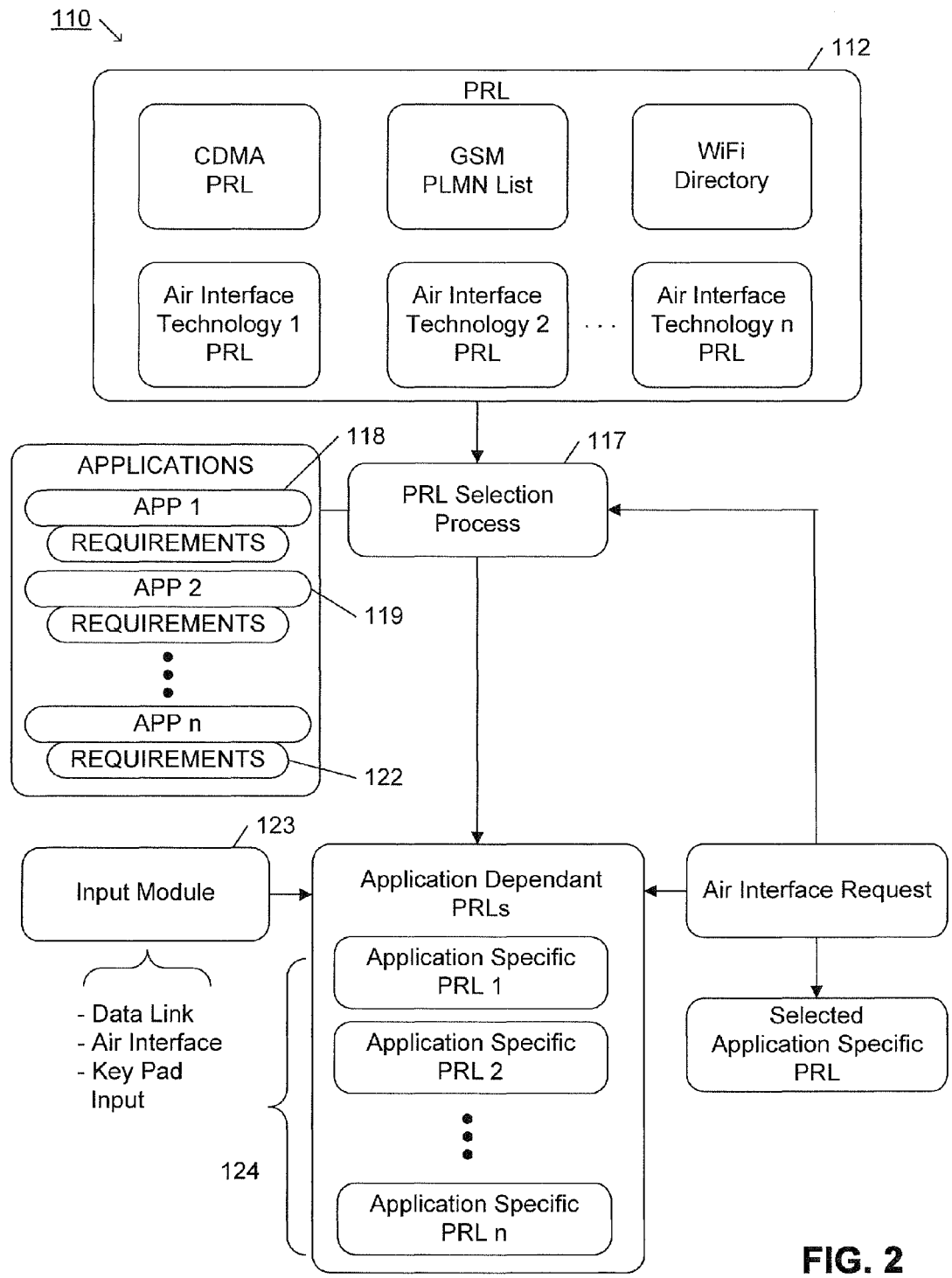
FIG. 2 is a block diagram of a process for using application specific access lists on a multi-mode mobile device in accordance with the present invention.

Referring now to FIG. 2, a block diagram of a method for generating application specific access lists on a multi-mode mobile device is illustrated. In method 110, the multi-mode mobile device stores or otherwise has access to standard technology specific access lists 112. Standard access lists 112 may be provided by the manufacturer of the multi-mode mobile device, or may have been provided by the service provider for each wireless technology. The standard access lists may be updated from time to time, either using an over-the-air update process, or by connecting the multi-mode mobile device to an update device, such as a computer system. In this case, the computer system may use a web browser to access a service provider web site, and download new or updated standard access lists to the connected multi-mode mobile device. It will be understood that various connection methods may be used, for example, USB, firewire, serial, or parallel cable connections. It will also be understood that a local wireless network, such as Bluetooth, may be used. Standard access lists 112 may include, for example, a CDMA PRL, a GSM PLMN List, a WiFi Directory, or any other existing or evolving format for storing air interface system lists. Typically, the multi-mode mobile device will have a standard access list for each wireless technology supported by the multi-mode mobile device.

The multi-mode mobile device is able to operate a set of applications such as voice 118, high-speed data reception 119, and Voice-over-IP (VoIP). It will be appreciated that many other applications and application types may be used, as well as combinations of applications and application specific requirements. Each of the applications has a set of application requirements 122, which may include minimum operating requirements, as well as desired technical features. Application requirements 122 may be chosen to relate to technical capabilities available in one or more of the standard asset lists 112. Alternatively, application requirements 122 may more generically set out desired technical features.

Access list selection process 117 is used to generate application specific access lists 124. Selection process 117 may operate when the multi-mode device first activates, or may operate to update and generate new application specific access lists from time-to-time. For example, selection process 117 may operate upon the update of one of the standard access lists, or upon the installation or availability of a new application. Selection process 117 is aware of the technical capabilities of each of the available standard wireless technologies, and is also aware of the applications likely to be operated on the multi-mode mobile device. Using the information regarding the standard technologies and the applications, the selection process 117 prioritizes each technology for each application. The prioritization may select a top choice, as well as other choices in descending desirability, and may also identify some technologies as not compatible with a particular application. In this way, selection process 117 generates an application specific access list for each application, with the application specific access list ranking the wireless technologies available on the multi-mode mobile device as being preferred, less preferred, or non-operating.

Method 110 also has an optional input module 123 for obtaining and storing application specific access lists 124 on the wireless subscriber unit. For example, input module 123 may be a data link cable configured to interface with the wireless subscriber unit, or may be acquired through an over-the-air communication. It will be appreciated that some application specific access lists 124 may be obtained as part of a firmware update, as individual lists, or as sets of lists. Input module 123 also may be a process consisting of combination of user input control messages used by the wireless subscriber unit in the process of generating or adjusting one or more application specific access lists 124.

Figure 3:
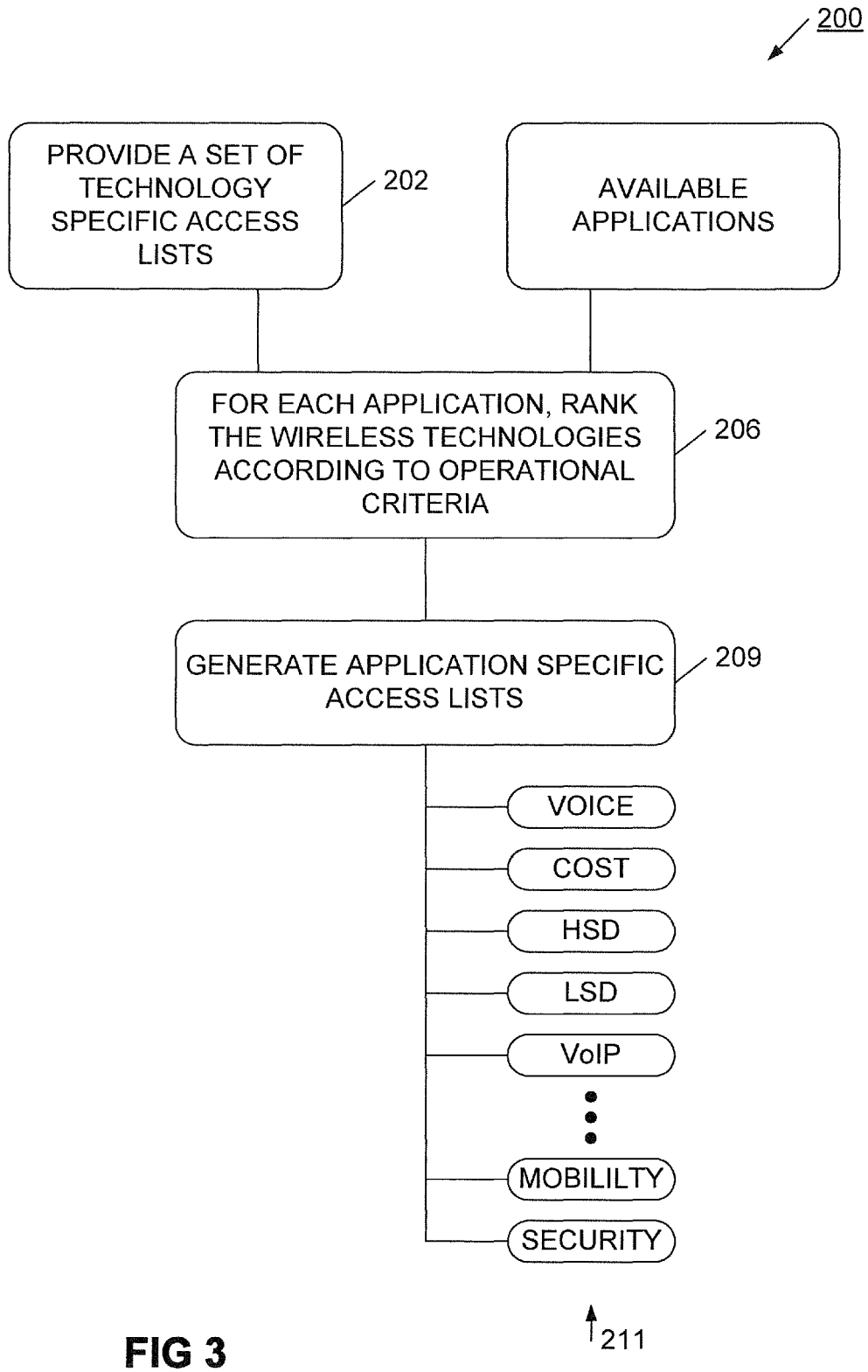
FIG. 3 is a flowchart of a process for generating application specific access lists on a multi-mode mobile device in accordance with the present invention.

Referring now to FIG. 3, a method for generating application specific access lists is illustrated. Method 200 has a set of technology specific access lists 202. These technology specific access lists are standard lists as provided by the manufacture of the multimode device or through the service provider of the specific wireless technology. For example, a CDMA access list may be initially provided by a manufacture of a wireless handset, and then updated from time to time by the CDMA wireless service provider. Typically, a multimode mobile device may have several available wireless technologies, such as CDMA2000, GSM, GPRS, WLAN, WiMax, or other available wireless technologies. Each of these available wireless technologies will have its own technology specific access list. The multimode mobile device also operates various applications, such as voice calls, high-speed data reception, voice over IP, video teleconference, web browsing or other applications. Each application has specific operational requirements that allow the application to perform in a desired manner. In some cases, an application may require a minimum set of operational procedures, such that some wireless technologies may not provide operation at all. Method 200 operates a process that for each application, ranks the available wireless technologies according to operational criteria for the application as shown in block 206. This process 206 may be operated when the multimode device is first initialized, and then may be operated from time to time thereafter. For example, the ranking process may be performed responsive to installing or the availability of new applications, or may be responsive to an update to one or more of the technology specific access lists. In another example, the ranking is performed responsive to detecting the mobile device is in a new geography. The detection of the geographic location may be according to a GPS device with in the multimode mobile device, or may be due to the acquisition or message received from a particular network provider.

Method 200 generates a set of application specific access lists as shown in block 209. These access lists may be stored locally in the multimode mobile device. Access lists may be generated specific to a voice application, high-speed data (HSD) application, low-speed data application (LSD), level of desired security, communication cost, or other application requirements. Further, the access list may combine requirements from multiple applications to more specifically defined requirements and preferred networks for a specific application. The set of application specific access lists 211 all are then available for use when an application is requested. In this way, a more preferred network may be efficiently acquired according to application needs.

Figure 4:
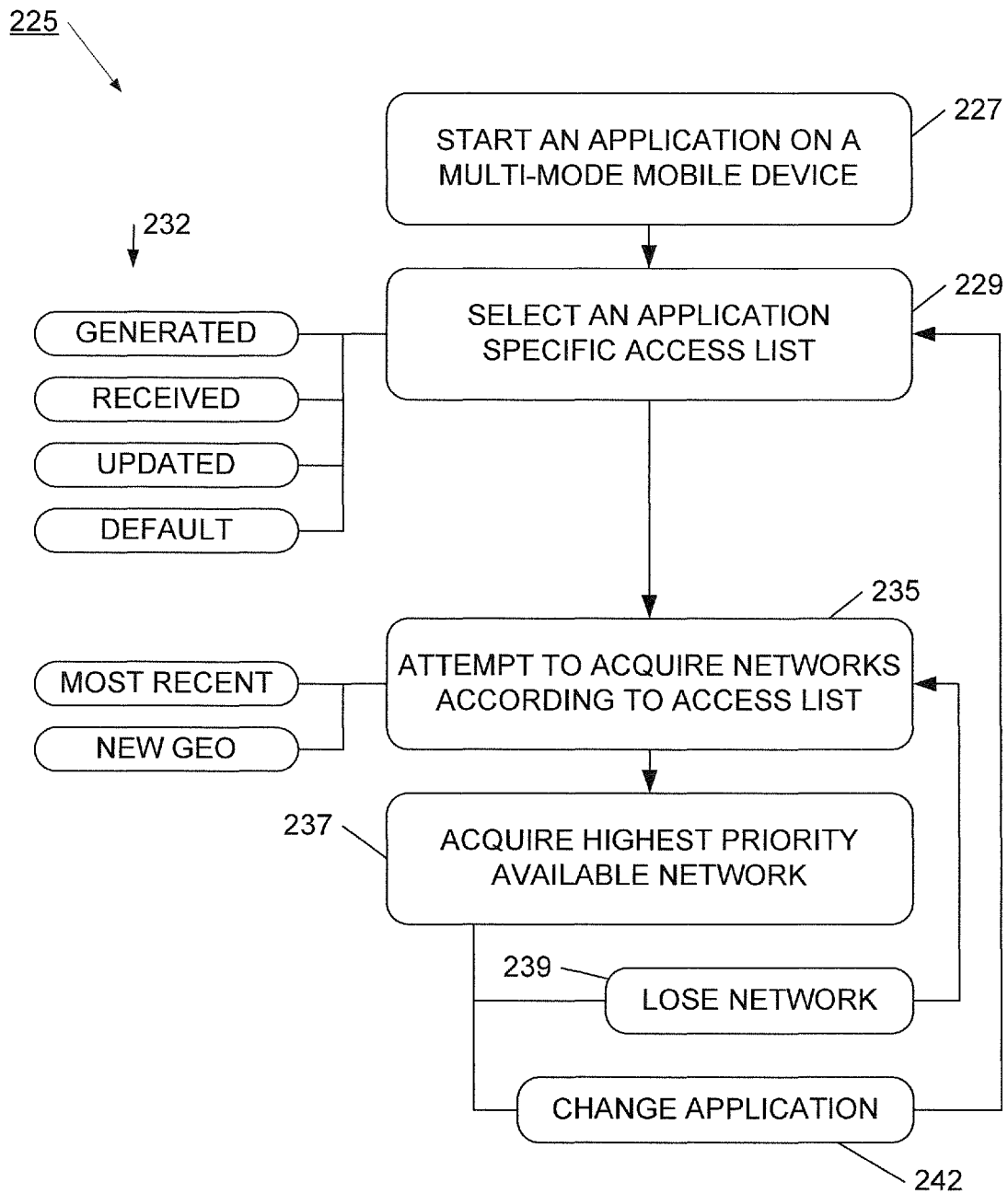
FIG. 4 is a flowchart of a process for using application specific access lists on a multi-mode mobile device in accordance with the present invention.

Referring now to FIG. 4, a method of acquiring a network is illustrated. Method 225 has a multimode mobile device that makes a request to start an application as shown in block 227. For example, the mobile device may request to make a high-quality voice call, or may request that a high-speed video data stream be received. It will be appreciated that many other applications may be requested. Responsive to making the application request, an application-specific access list is retrieved as shown in block 229. A set of application-specific access lists 232 is available to the multimode mobile device. These application-specific access lists may have been previously generated during startup of the multimode mobile device, and may have been periodically updated according to new applications, updated technology specific access lists, or detected geographic location. Also, the application-specific access list may have been received through a direct or wired connection. The multimode mobile device selects an application-specific access list appropriate to the requested application, and attempts to acquire a network according to the selected access list as shown in block 235. The application-specific access list may include a most recent list to assist in more efficiently acquiring a network. In some cases, the access list may be updated according to a detected geographic location for the multimode mobile device. Method 225 sequentially attempts to connect to networks listed in the access list according to their prioritization or ranking, and acquires the highest priority available network as shown in block 237.

After the network has been acquired, and the application is using the acquired network for communication, it is possible that the network may be lost as shown in block 239. On losing the network, the method 225 may again use the selected application-specific access list to find and acquire another network. Also, the user may decide to change applications as shown in block 242. Responsive to changing the application, an application-specific access list is retrieved for the new application. Method 200 may then determine if the current network should be dropped, and the new access list used to acquire a new network, or if the currently active network provides sufficient operational capabilities. For example, method 200 may determine that even though the current network is not optimal for the new application, it provides sufficient capability. In this way, the time delay for attempting to acquire a new network may be avoided. However, in other cases method 200 may determine that the current network should be dropped, and a more suitable network acquired, if available.

Figure 5:
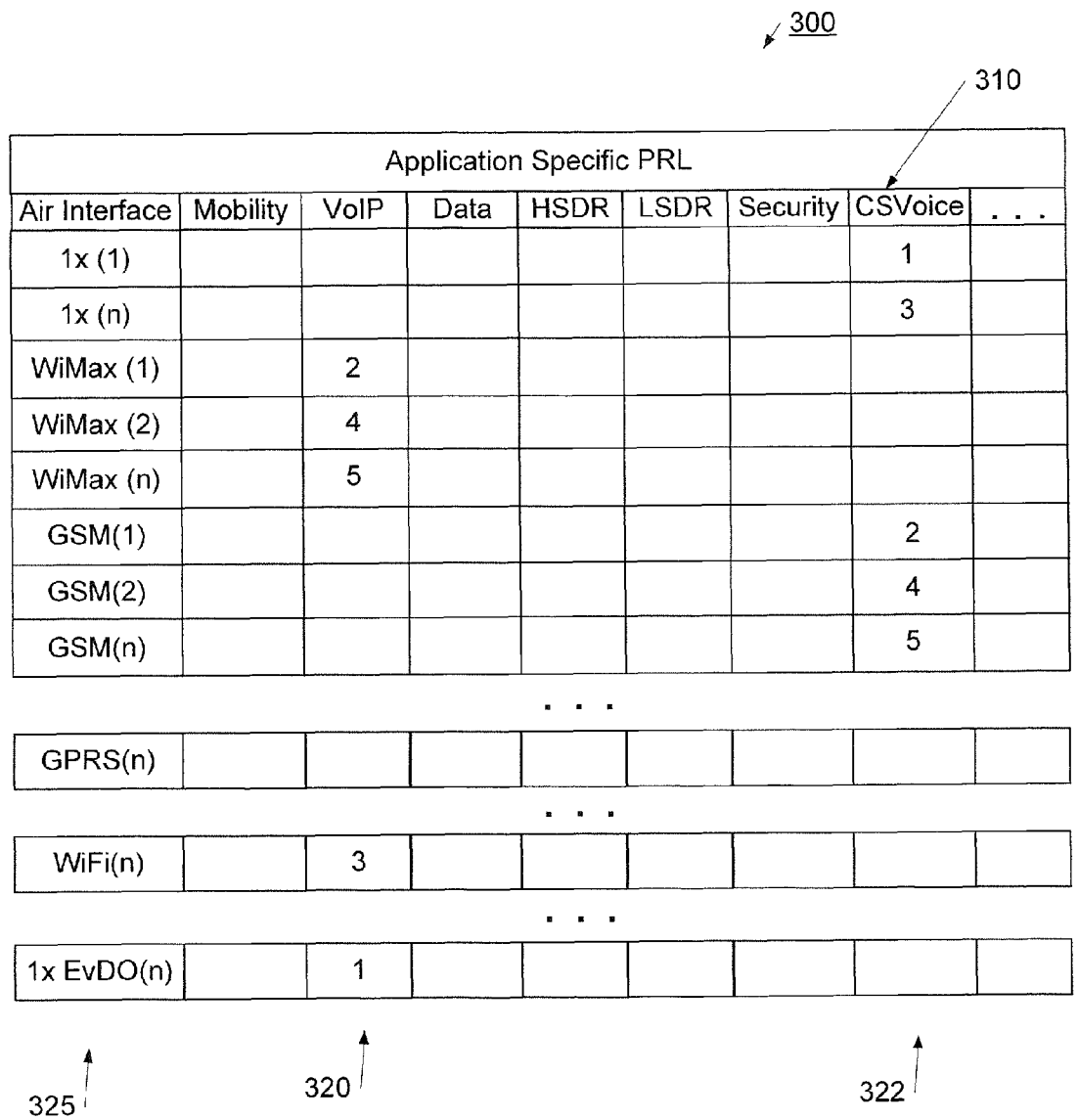
FIG. 5 is a set of application specific access list for a multi-mode wireless device in accordance with the present invention.

Referring now to FIG. 5, a set of application specific access lists is illustrated. The set of application-specific access lists is shown as table 300. Table 300 is only partially completed to assist in simplifying explanation. It will be understood that the table will be more completely filled during actual use. Table 300 is generated according to operational requirements for various available applications, and ranks available wireless technologies and the available networks according to their applicability to a specific application. The available applications on the multimode mobile device are listed along one axis 310, while the other axis lists available networks 325. Available networks 325 are shown arranged according to wireless technology, although other arrangements are contemplated. In this way, each column represents an application-specific access list that ranks available networks. For each application specific access list, particular available networks have been selected and ranked according to their suitability to the defined application. As illustrated, each wireless technology may have multiple available networks, each of which may be separately selected and prioritized. In this way, the application specific access list may prefer a first network in a first wireless technology, a network in a second wireless technology, and then a second network in the first wireless technology. Such selection flexibility facilitates selecting a preferred available network.

For example, voice over IP access list 320 shows that 1xEvDO is the preferred technology, WiMax is the second preferred technology, and WiFi is the last preferred technology. The other available technologies are excluded from consideration. In a similar manner, a high-quality voice channel access list 322 indicates three ranked technologies, and an exclusion of the other technologies. It will be appreciated that the application-specific access list may be stored in other data arrangements. It will also be understood that table 300 may define classes of applications, as well as use specific applications as shown. Further, some applications may require specific performance characteristics, such as increased quality of service (QoS), which will affect the prioritization of the technologies.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A method for selecting an air interface on a multi-mode wireless device capable of communicating over a plurality of air interfaces, the method comprising:
   accessing a plurality of technology specific access lists for a plurality of wireless technologies, each technology specific access list defining networks for a respective wireless technology;
   ranking the networks in descending desirability according at least to application specific criteria of individual applications of a set of applications expected to be executed in the multi-mode wireless device and operational features of the plurality of wireless technologies; and
   generating the set of application specific access lists based on the ranking, each application specific access list corresponding to a respective application of the set of applications expected to be executed in the multi-mode wireless device and including at least one of the networks associated with the plurality of technology specific access lists;
   starting a first application;
   selecting a first application specific access list of the set of application specific access lists, the first application specific access list corresponding to the first application;
   selecting a first active network from the first application access specific list, the first active network representing an available and most desirable network for the first application in the first application specific access list;
   activating the first active network for use by the first application; and
   switching from the first active network to a second active network if a user switches from the first application to a second application, the second active network representing an available and most desirable network for the second application in a second application specific access list of said set of application specific access lists, wherein the first active network and the second active network are ascertained based on the set of application specific access lists, wherein the switching from the first active network to the second active network is performed even if the first active network is still available when switching to the second application.

2. The method of claim 1 further comprising:
   determining a geographic region of the multi-mode wireless device; and
   selecting networks according to the determined graphic region.

3. The method of claim 1 wherein the set of application specific access lists include at least one of a voice list, a data list, a high-speed data list, a low speed data list, a security list, a mobility list, and a voice-over-IP list.

4. The method of claim 1 further comprising storing the set of application specific access lists on the multi-mode wireless device.

5. The method of claim 4 wherein the storing the set of application specific access lists further comprises downloading the set of application specific access lists using an over an air interface.

6. The method of claim 1 further comprising storing the plurality of technology specific access lists on a remote server.

7. The method of claim 1 wherein the ranking the networks comprises:
   assigning each of the networks a priority based on its suitability for a particular application; and
   storing the priority in a data structure.

8. The method of claim 1 wherein the plurality of technology specific access lists include at least one of cdma2000 Ix, IxEV-DO, GPRS, GSM, GPRS, PHS, WiMax, and WLAN.

9. The method of claim 2 further comprising selecting the networks based on suitability for a particular application.

10. The method of claim 2 wherein the determining the geographic region comprises utilizing GPS.

11. The method of claim 2, further comprising acquiring a network.

12. A method for selecting an air interface on a multi-mode wireless device capable of communicating over a plurality of air interfaces, the method comprising:
   accessing a plurality of technology specific access lists for a plurality of wireless technologies, each technology specific access list defining networks for a respective wireless technology;
   ranking the networks in descending desirability according at least to application specific criteria pertaining to a combination of at least two different applications expected to be executed in the multi-mode wireless device and operational features of the plurality of wireless technologies; and
   generating a set of application specific access lists based on the ranking, a first application specific access list corresponding to a respective combination of at least two different applications expected to be executed in the multi-mode wireless device and including at least one of the networks associated with the plurality of technology specific access lists;
   selecting a first active network from the first application access specific list, the first active network representing an available and most desirable network for a first combination of at least two different applications in the first application specific access list;
   activating the first active network for use by the first combination of at least two different applications; and
   switching from the first active network to a second active network if a user switches from the first combination of at least two different applications to a second combination of at least two different applications, the second active network representing an available and most desirable network for the second combination of at least two different applications, wherein the first active network and the second active network are ascertained based on the set of application specific access lists, wherein the switching from the first active network to the second active network is performed even if the first active network is still available when switching to the second combination of at least two different applications.

13. The method of claim 12 further comprising storing the set of application specific access lists on the multi-mode wireless device.

14. The method of claim 13 wherein the storing the set of application specific access lists further comprises downloading the set of application specific access lists using an over an air interface.

15. The method of claim 12 further comprising storing the set of application specific access lists on a remote server.

16. The method of claim 12 further comprising storing the plurality of technology specific access lists on a remote server.

17. The method of claim 12 wherein the set of application specific access lists include at least one of a voice list, a data list, a high-speed data list, a low speed data list, a security list, a mobility list, and a voice-over-IP list.

18. The method of claim 12 further comprising:
   determining a geographic region of the multi-mode wireless device; and
   selecting the networks according to the determined geographic region.

19. The method of claim 18 wherein the determining the geographic region comprises utilizing GPS.

\* \* \* \* \*